US011611528B2

(12) United States Patent
Kondo et al.

(10) Patent No.: US 11,611,528 B2
(45) Date of Patent: Mar. 21, 2023

(54) DEVICE ESTIMATION DEVICE, DEVICE ESTIMATION METHOD, AND DEVICE ESTIMATION PROGRAM

(71) Applicant: NIPPON TELEGRAPH AND TELEPHONE CORPORATION, Tokyo (JP)

(72) Inventors: Tsuyoshi Kondo, Musashino (JP); Shingo Kashima, Musashino (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 0 days.

(21) Appl. No.: 17/621,255

(22) PCT Filed: Jun. 28, 2019

(86) PCT No.: PCT/JP2019/025956
§ 371 (c)(1),
(2) Date: Dec. 21, 2021

(87) PCT Pub. No.: WO2020/261570
PCT Pub. Date: Dec. 30, 2020

(65) Prior Publication Data
US 2022/0360555 A1    Nov. 10, 2022

(51) Int. Cl.
*H04L 61/4541* (2022.01)
*H04L 61/4511* (2022.01)
(Continued)

(52) U.S. Cl.
CPC ...... *H04L 61/4511* (2022.05); *H04L 61/4541* (2022.05); *H04L 61/4588* (2022.05); *H04L 61/5014* (2022.05); *H04L 61/5069* (2022.05)

(58) Field of Classification Search
CPC ............. H04L 61/4511; H04L 61/4541; H04L 61/4588; H04L 61/5014; H04L 61/5069; H04L 63/04
(Continued)

(56) References Cited

U.S. PATENT DOCUMENTS

2002/0010798 A1 * 1/2002 Ben-Shaul .......... H04L 67/1023
                                                      707/E17.116
2004/0137900 A1 * 7/2004 Varonen .................. H04L 67/52
                                                      455/433
(Continued)

FOREIGN PATENT DOCUMENTS

| JP | 3966598 B2 * | 8/2007 | ............. G06F 9/505 |
| JP | 2011-96173 A | 5/2011 | |
| WO | 2015/137190 A1 | 9/2015 | |

OTHER PUBLICATIONS

Kondo et al., "Review of Device Estimation Method Using DNS Inquiry", Lecture Proceedings of the 80th National Convention of Network Security, Mar. 13, 2018, 11 pages including English Translation.
(Continued)

*Primary Examiner* — Khanh Q Dinh
(74) *Attorney, Agent, or Firm* — Xsensus LLP (57) ABSTRACT

A device estimating apparatus acquires one or more DNS queries transmitted from each device connected to a network and generates comparison source data in which each content of the acquired DNS queries is associated with one or more pieces of attribute information of each of the one or more devices that have transmitted the DNS queries having the content. Thereafter, when one or more DNS queries are acquired from an estimation target device, the device estimating apparatus reads, for each DNS query, attribute information of one or more devices associated with a content of the DNS query from the comparison source data and esti-
(Continued)

mates an attribute of the estimation target device using the read attribute information.

4 Claims, 8 Drawing Sheets

(51) Int. Cl.
 *H04L 61/5069* (2022.01)
 *H04L 61/5014* (2022.01)
 *H04L 61/4588* (2022.01)
(58) Field of Classification Search
 USPC .............................. 709/220, 224, 226, 228
 See application file for complete search history.

(56) References Cited

U.S. PATENT DOCUMENTS

| | | | | |
|---|---|---|---|---|
| 2010/0088405 | A1* | 4/2010 | Huang | H04L 41/12 709/224 |
| 2016/0036762 | A1* | 2/2016 | Droms | H04L 41/12 709/224 |
| 2016/0330236 | A1* | 11/2016 | Reddy | H04L 63/1416 |
| 2017/0017833 | A1 | 1/2017 | Watanabe et al. | |
| 2017/0135068 | A1* | 5/2017 | Kodaypak | H04L 65/1023 |
| 2021/0314238 | A1* | 10/2021 | Cioffi | H04L 43/55 |

OTHER PUBLICATIONS

Kawaguchi, "Estimation of OS Using DNS Query Patterns", Presentation of Graduation Thesis, Feb. 1, 2010, 59 pages including English Translation.

* cited by examiner

Fig. 1

| MODEL NUMBER | DOMAIN NAME IN DNS QUERY | example1.com | example2.com | example3.com | example4.com |
|---|---|---|---|---|---|
| A | | 1 | 1 | 0 | 0 |
| B | | 0 | 1 | 1 | 1 |
| C | | 0 | 1 | 0 | 1 |
| D | | 0 | 1 | 0 | 1 |

Fig. 2

| MANUFACTURER | CATEGORY | MODEL NUMBER | DOMAIN NAME | example1.com | example2.com | example3.com | example4.com |
|---|---|---|---|---|---|---|---|
| | | | | 1 | 4 | 1 | 3 |
| COMPANY T | TELEVISION | A | 2 | 1 | 1 | 0 | 0 |
| COMPANY F | SMARTPHONE | B | 3 | 0 | 1 | 1 | 1 |
| COMPANY S | TELEVISION | C | 2 | 0 | 1 | 0 | 1 |
| COMPANY A | SMARTPHONE | D | 2 | 0 | 1 | 0 | 1 |

(MANUFACTURER, CATEGORY, MODEL NUMBER = LABEL)

Fig. 3

| | | | DOMAIN NAME | example1.com | example2.com | example3.com | example4.com |
|---|---|---|---|---|---|---|---|
| | | | CATEGORY | TELEVISION | *_TELEVISION, SMARTPHONE | SMARTPHONE | *_TELEVISION, SMARTPHONE |
| | | | MANUFACTURER | COMPANY T | *_COMPANY T, COMPANY F, COMPANY S, COMPANY A | COMPANY F | *_COMPANY F, COMPANY A |
| MANUFACTURER | CATEGORY | MODEL NUMBER | | 1 | 4 | 1 | 3 |
| COMPANY T | TELEVISION | A | 2 | 1 | 1 | 0 | 0 |
| COMPANY F | SMARTPHONE | B | 3 | 0 | 1 | 1 | 1 |
| COMPANY S | TELEVISION | C | 2 | 0 | 1 | 0 | 1 |
| COMPANY A | SMARTPHONE | D | 2 | 0 | 1 | 0 | 1 |

| DOMAIN NAME | CATEGORY | MANUFACTURER | | | | | |
|---|---|---|---|---|---|---|---|
| example1.com | TELEVISION | COMPANY T | 1 | 1 | 0 | 0 | 0 |
| example2.com | *_TELEVISION,_SMARTPHONE | *_COMPANY T, COMPANY F,_COMPANY S, COMPANY A | 4 | 1 | 1 | 1 | 1 |
| example3.com | SMARTPHONE | COMPANY F | 1 | 0 | 1 | 0 | 0 |
| example4.com | *_TELEVISION,_SMARTPHONE | *_COMPANY F, COMPANY S,_COMPANY A | 3 | 0 | 1 | 1 | 1 |
| | | | 2 | 3 | 2 | 2 | |

| CORRECT ANSWER | | | ESTIMATED VALUE | |
|---|---|---|---|---|
| MANUFACTURER | CATEGORY | MODEL NUMBER | MANUFACTURER | CATEGORY |
| COMPANY T | TELEVISION | A | COMPANY T | TELEVISION |
| COMPANY F | SMARTPHONE | B | COMPANY F | SMARTPHONE |
| COMPANY S | TELEVISION | C | *_COMPANY F, COMPANY S,_COMPANY A | *_TELEVISION,_SMARTPHONE |
| COMPANY A | SMARTPHONE | D | *_COMPANY F, COMPANY S,_COMPANY A | *_TELEVISION,_SMARTPHONE |

Fig. 7

| DOMAIN NAME | CATEGORY | MANUFACTURER | | | | |
|---|---|---|---|---|---|---|
| example1.com | TELEVISION | COMPANY T | 1 | 1 | 0 | 0 | 0 |
| example2.com | TELEVISION, * SMARTPHONE | * COMPANY T, COMPANY S, COMPANY A | 4 | 1 | 1 | 1 | 1 |
| example3.com | SMARTPHONE | COMPANY F | 1 | 0 | 1 | 0 | 0 |
| example4.com | TELEVISION, * SMARTPHONE | * COMPANY F, COMPANY S, COMPANY A | 3 | 0 | 1 | 1 | 1 |
| | | | | 2 | 3 | 2 | 2 |

| CORRECT ANSWER | | | ESTIMATED VALUE | |
|---|---|---|---|---|
| MANUFACTURER | CATEGORY | MODEL NUMBER | MANUFACTURER | CATEGORY |
| COMPANY T | TELEVISION | A | * COMPANY T, COMPANY F, COMPANY S, COMPANY A | * TELEVISION, SMARTPHONE |
| COMPANY F | SMARTPHONE | B | * COMPANY T, COMPANY F, COMPANY S, COMPANY A | * TELEVISION, SMARTPHONE |
| COMPANY S | TELEVISION | C | * COMPANY T, COMPANY F, COMPANY S, COMPANY A | * TELEVISION, SMARTPHONE |
| COMPANY A | SMARTPHONE | D | * COMPANY T, COMPANY F, COMPANY S, COMPANY A | * TELEVISION, SMARTPHONE |

DEVICE ESTIMATION DEVICE, DEVICE ESTIMATION METHOD, AND DEVICE ESTIMATION PROGRAM

CROSS-REFERENCE TO RELATED APPLICATION

The present application is based on PCT filing PCT/JP2019/025956, filed Jun. 28, 2019, the entire contents of which are incorporated herein by reference.

TECHNICAL FIELD

The present invention relates to a device estimating apparatus, a device estimating method, and a device estimating program.

BACKGROUND ART

In the related art, there is a technology for estimating an OS and the like of a device within a network using a pattern of a domain name system (DNS) query transmitted from the device (see Non Patent Literature 1).

CITATION LIST

Non Patent Literature

Non Patent Literature 1: Estimation of OS using DNS query pattern [retrieved Jun. 7, 2019], the Internet: <URL: https://www.goto.info.waseda.acjp/forB4/pdf-th/2009/0201_kawaguchi.pdf>

SUMMARY OF THE INVENTION

Technical Problem

Comparison source data used in estimating an OS or the like of a device in the technology described above is DNS queries of devices connected in the past. Thus, for example, when the number of devices that can be estimated is increased, the amount of the comparison source data becomes extremely large. Thus, there are problems in that a large amount of memory is occupied at the time of estimation of a device, and that the amount of calculation at the time of estimation is large. Thus, an object of the present invention is to solve the problems described above and prevent comparison source data used for estimating a device from becoming extremely large even in a case where the number of devices that can be estimated is increased.

Means for Solving the Problem

In order to solve the problems described above, the present invention includes: a first DNS query acquiring unit configured to acquire DNS queries transmitted from respective devices connected to a network; a comparison source data generating unit configured to generate comparison source data in which respective contents of the acquired DNS queries are associated with attribute information of the respective devices that have transmitted the DNS queries having the contents; a second DNS query acquiring unit configured to acquire one or more DNS queries from an estimation target device; and an estimation unit configured to read, for each DNS query acquired from the estimation target device, attribute information of one or more devices associated with a content of the DNS query from the comparison source data and estimate an attribute of the estimation target device using the read attribute information.

Effects of the Invention

According to the present invention, comparison source data used for estimating a device can be prevented from becoming extremely large even in a case where the number of devices that can be estimated is increased.

DESCRIPTION OF EMBODIMENTS

Hereinafter, modes (embodiments) of the present invention will be described with reference to the drawings. In the following description, examples of a device include an Internet of Things (IoT) device and an Information and Communication Technology (ICT) device that are connected to a network and performs communication. In addition, examples of attributes of the device include a model number of the device, a manufacturer of the device, and a category (for example, a television, a smartphone, or the like) of the device. The present invention is not limited to the embodiment described below.

Figure 1:
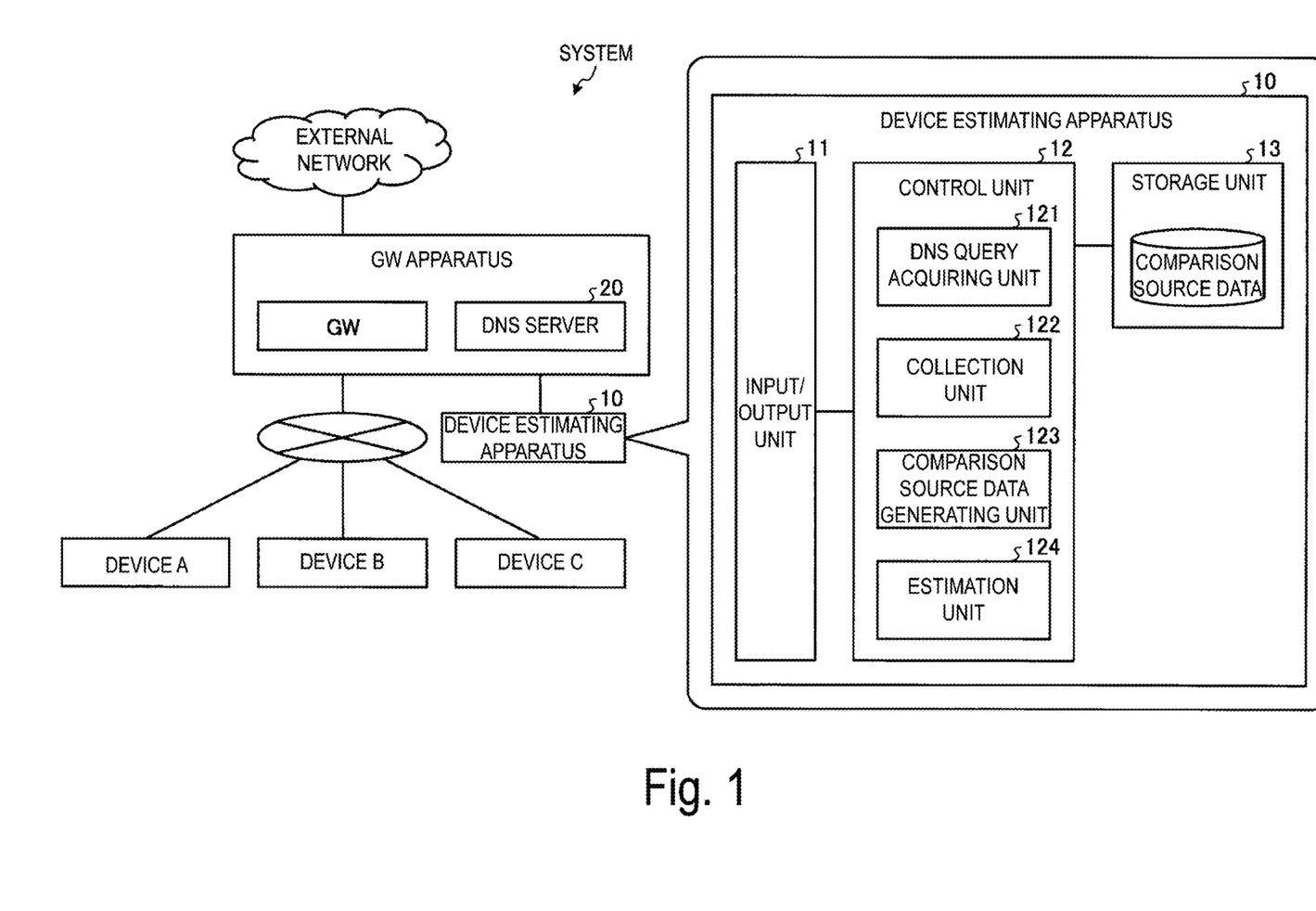
FIG. 1 is a diagram illustrating a configuration example of a system and a configuration example of a device estimating apparatus.

As illustrated in FIG. 1, a system according to this embodiment includes, for example, a plurality of devices (for example, devices A, B, and C), a gateway (GW) apparatus that connects each device to an external network, and a device estimating apparatus 10. The GW apparatus includes a GW and a DNS server 20.

The GW connects each of the devices described above (for example, the devices A, B, and C) and an external network (for example, the Internet) to each other. In addition, when receiving a DNS query from each device through the GW, the DNS server 20 returns a response to the DNS query.

The device estimating apparatus 10 acquires, from the DNS server 20, a DNS query from each device and estimates attributes of each device based on the acquired DNS query. For example, the device estimating apparatus 10 estimates a manufacturer and a category of each device.

For example, first, the device estimating apparatus 10 collects contents of DNS queries transmitted from devices (for example, the devices A and B), the manufacturers and the categories of which are previously known, and generates comparison source data. The comparison source data is, for example, information in which each of the contents of the DNS query is associated with attribute information (for example, a manufacturer, a category, and the like of the device) of a device that is a transmission source of the DNS query having this content. Thereafter, when acquiring a DNS query transmitted from an estimation target device (for example, the device C), the device estimating apparatus 10 estimates a manufacturer, a category, and the like of the estimation target device based on contents of the acquired DNS query and the comparison source data.

Referring back to FIG. 1, the device estimating apparatus 10 will be described in detail. As illustrated in FIG. 1, the device estimating apparatus 10, for example, includes an input/output unit 11, a control unit 12, and a storage unit 13.

The input/output unit 11 is responsible for an interface for data input/output from/to an external apparatus. For example, the input/output unit 11 receives a DNS query to be used as the comparison source data and a DNS query from an estimation target device and outputs an estimation result such as a manufacturer, a category, and the like of the device.

The control unit 12 is responsible for controlling the entire device estimating apparatus 10. The control unit 12 includes a DNS query acquiring unit (a first DNS query acquiring unit and a second DNS query acquiring unit) 121, a collection unit 122, a comparison source data generating unit 123, and an estimation unit 124.

The DNS query acquiring unit 121 acquires a DNS query from each device. For example, the DNS query acquiring unit 121 acquires, as a DNS query for the comparison source data, a DNS query transmitted from a device, the manufacturer, the category, and the like of which are known in advance. In addition, the DNS query acquiring unit 121 acquires a DNS query from an estimation target device.

The collection unit 122 collects contents of a DNS query from each device acquired by the DNS query acquiring unit 121 for each of devices that are transmission sources of DNS queries (for example, for each device model number).

Figure 2:
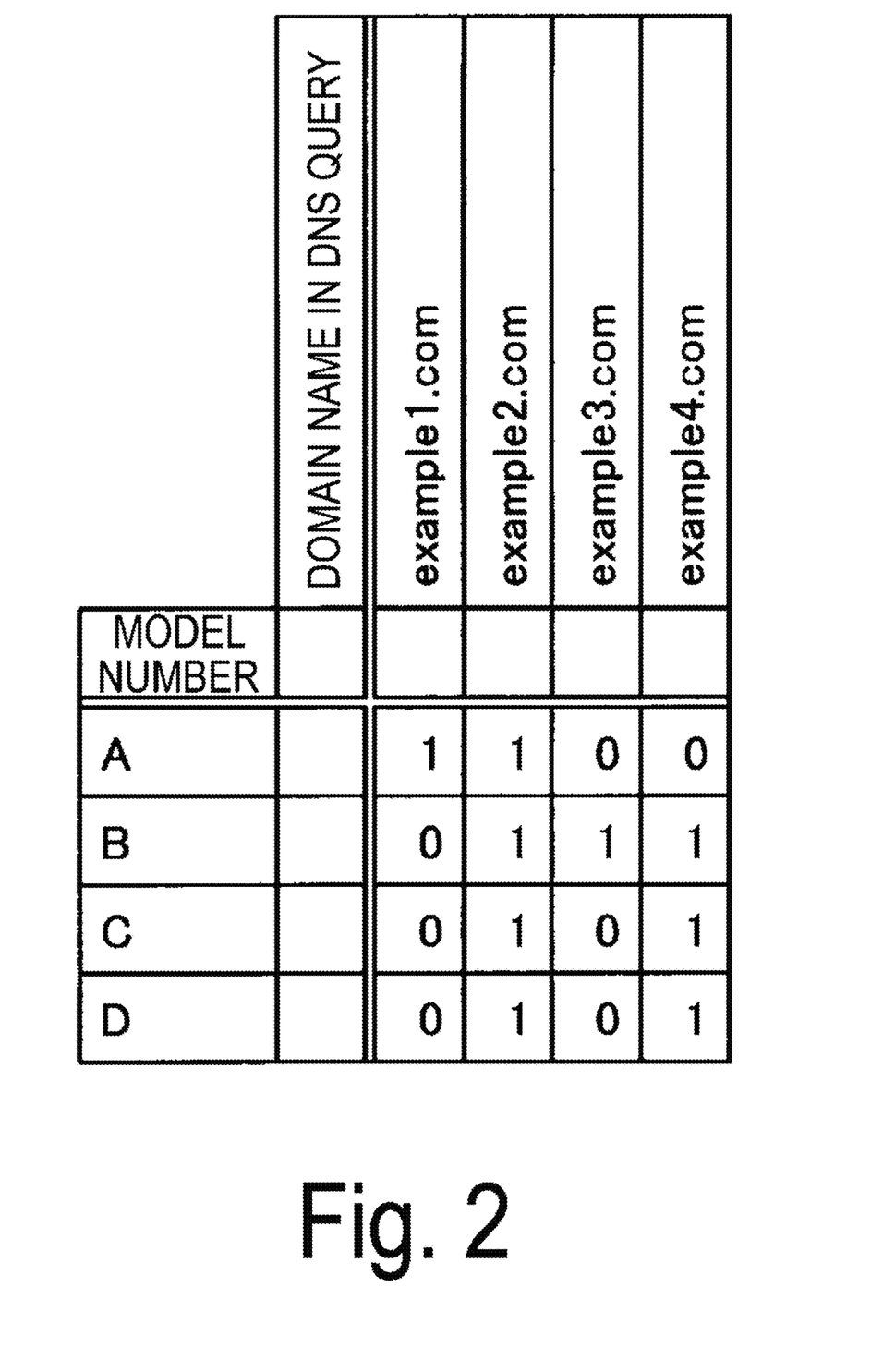
FIG. 2 is a diagram illustrating an example of collected data.

For example, as illustrated in FIG. 2, the collection unit 122 collects, for each model number of a device, a domain name in the DNS query transmitted from the device with the model number. Collection results illustrated in FIG. 2 indicate that DNS queries transmitted from a device with the model number "A" are DNS queries for the domain name "example1.com" and the domain name "example2.com". In addition, the collection results indicate that DNS queries transmitted from a device with the model number "B" are DNS queries for the domain name "example2.com", the domain name "example3.com", and the domain name "example4.com".

The comparison source data generating unit 123 generates comparison source data using the collection results of the DNS queries described above (DNS queries for the comparison source data).

Figure 3:
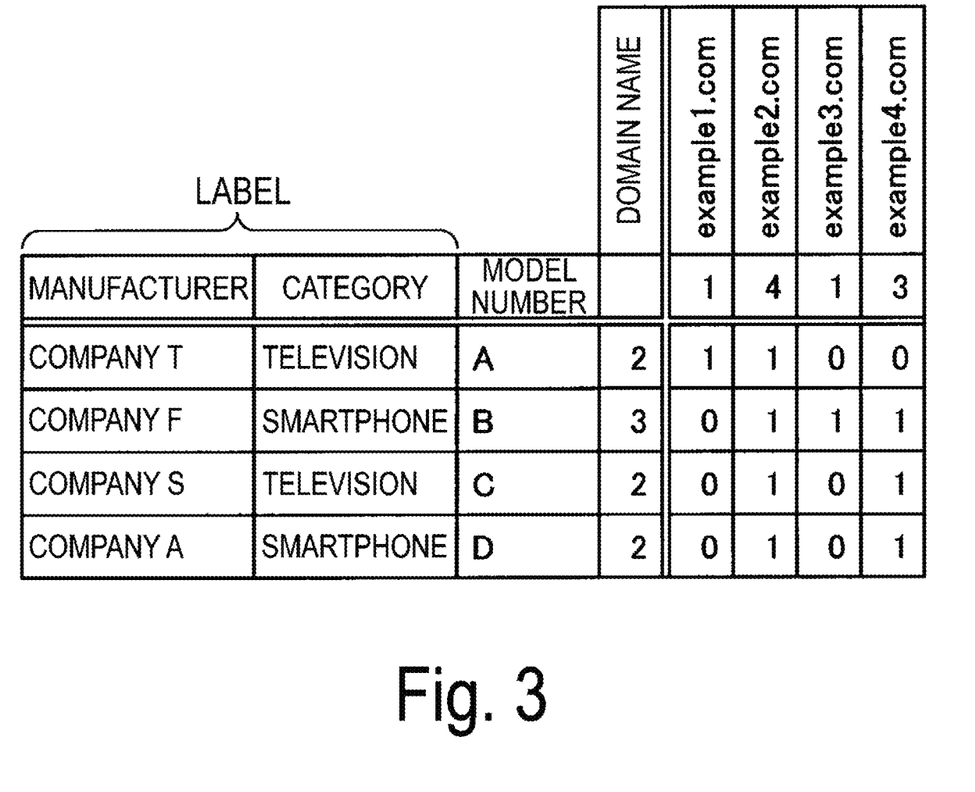
FIG. 3 is a diagram illustrating an example of assignment of labels to the collected data.

For example, the comparison source data generating unit 123, first, assigns, to devices that are transmission sources of the DNS queries, labels representing attribute information (for example, a manufacturer and a category) of the devices in the collection results of the DNS queries described above (see FIG. 3).

Next, the comparison source data generating unit 123 generates comparison source data in which each of the contents of the DNS queries in the above DNS query collection results is associated with one or more pieces of attribute information (the label described above) of each of one or more devices that are transmission sources of the DNS queries. For example, the comparison source data generating unit 123 generates comparison source data in which each of the domain names of the DNS queries in the above DNS query collection results is associated with a label of a device that is a transmission source of the DNS query having the domain name (see FIG. 4).

Figure 4:
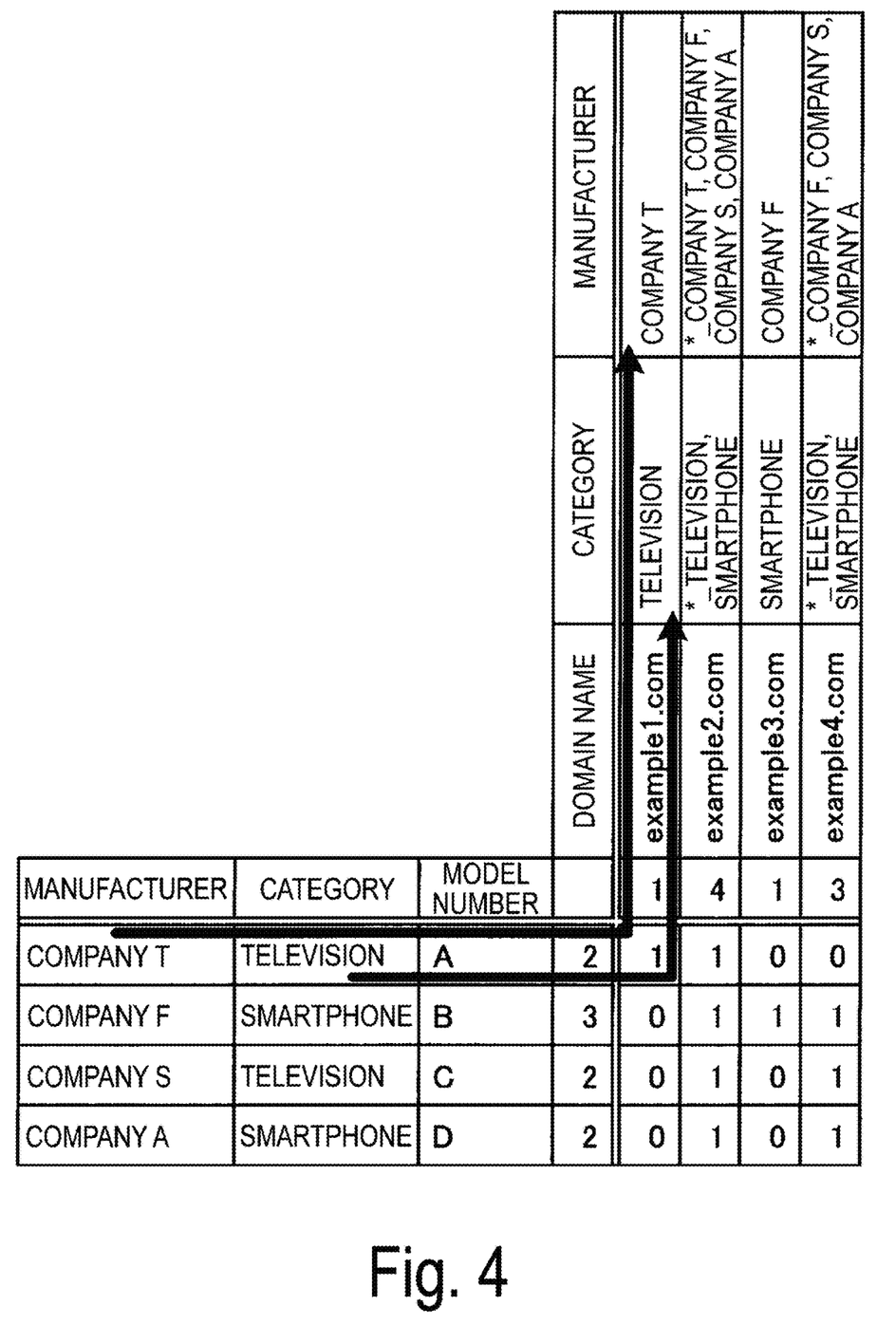
FIG. 4 is a diagram illustrating an example of comparison source data.

For example, as illustrated in FIG. 4, a device that is a transmission source of the domain name "example1.com" is only a device with the model number "A", and thus the comparison source data generating unit 123 associates the category label "television" and the manufacturer label "company T" of the device with the model number "A" with the domain name "example1.com". In addition, devices that are transmission sources of the domain name "example2.com" are devices with the model number "A", the model number "B", the model number "C", and the model number "D", and thus the comparison source data generating unit 123 associates the category labels "television, smartphone" and the manufacturer labels "company T, company F, company S, company A" of the four devices described above with the domain name "example2.com". In FIG. 4, a part indicated using "*_" represents a part to which a plurality of labels are assigned.

In addition, in a case where there are a plurality of devices that are transmission sources of DNS queries for the domain name, and labels of the devices are the same, the comparison source data generating unit 123 may include information of the number of the corresponding devices in the description in the label in the comparison source data.

For example, as illustrated in FIG. 4, the number of devices with the label "television" associated with the domain name "example2.com" by the comparison source data generating unit 123 is two, and the number of devices with the label "smartphone" is two. Thus, the comparison source data generating unit 123 may include, in the comparison source data, the information of the numbers of devices corresponding to the description in each label. For example, "television (two units), smartphone (two units)" is described in the category label of the devices associated with the domain name "example2.com".

In addition, when generating the comparison source data, the comparison source data generating unit 123 associates the domain name of a DNS query with the label of each device that is a transmission source of the DNS query for the domain name. A label associated with the domain name of the DNS query described above may be generated by taking a logical sum (OR) of the labels of the devices or may be generated by taking a simple sum or a logical product (AND) of the labels of the devices.

FIG. 1 is referred to again for description. The estimation unit 124 estimates attributes of an estimation target device using a DNS query acquired from the estimation target device and the comparison source data.

For example, for each of one or more DNS queries acquired from an estimation target device, the estimation unit 124 reads, from the comparison source data, attribute information of one or more devices associated with the contents of the DNS query. Then, the estimation unit 124 estimates attributes of the estimation target device using the read attribute information. For example, the estimation unit 124 outputs a manufacturer, a category, and the like represented in the read attribute information as a result of the estimation of the attributes of the estimation target device. Details of the estimation of attributes of a device using the estimation unit 124 will be described below using a specific example.

The storage unit 13 stores various kinds of data to be referred to when the control unit 12 estimates a device that is a transmission source of a DNS query. For example, the storage unit 13 stores the comparison source data (see FIG. 4) generated by the comparison source data generating unit 123.

Figure 5:
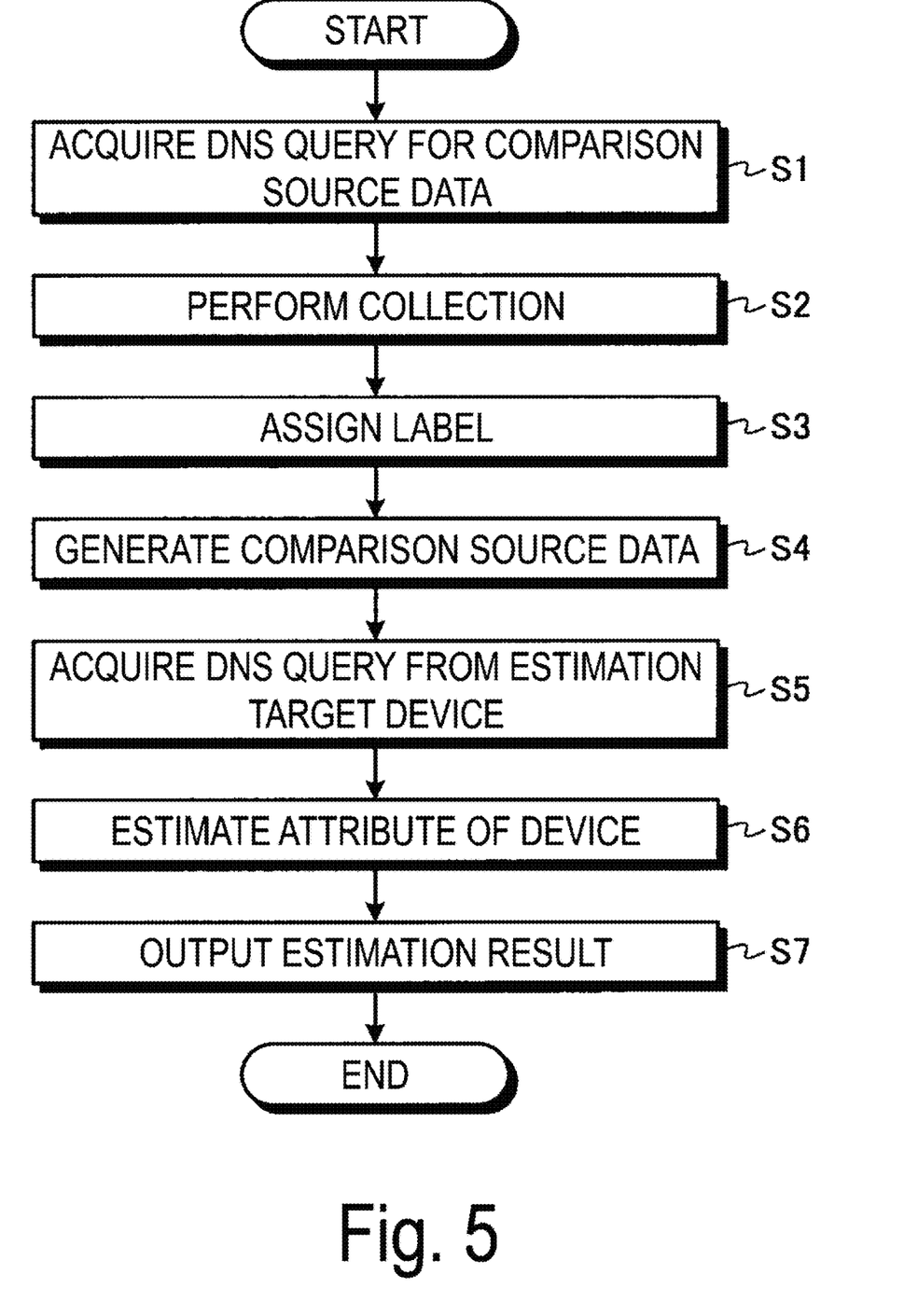
FIG. 5 is a flowchart illustrating an example of a processing sequence of the device estimating apparatus illustrated in FIG. 1.

Next, an example of a processing sequence of the device estimating apparatus 10 will be described with reference to FIG. 5. First, the comparison source data generating unit 123 of the device estimating apparatus 10 acquires DNS queries for the comparison source data using the DNS query acquiring unit 121 (S1).

After S1, the comparison source data generating unit 123 collects, for each of devices that are transmission sources of the DNS queries, contents of the DNS queries for the comparison source data acquired in S1 by the collection unit 122 (S2). Thereafter, the comparison source data generating unit 123 assigns labels representing the attribute information of the devices that are the transmission sources of the DNS queries to collection results acquired in S2 (S3). Then, the comparison source data generating unit 123 generates comparison source data based on the information acquired by assigning the labels to the collection results acquired in S2 (S4). Thereafter, the comparison source data generating unit 123 stores the generated comparison source data in the storage unit 13.

After S3, the estimation unit 124 acquires a DNS query from an estimation target device using the DNS query acquiring unit 121 (S5). Then, the estimation unit 124 estimates the estimation target device by referring to the DNS query from the estimation target device acquired in S5 and the comparison source data generated in S4 (S6). For example, the estimation unit 124 estimates attributes of the estimation target device (a manufacturer, a category, and the like of the device). Thereafter, the estimation unit 124 outputs a result of the estimation of the estimation target device (S7).

In this way, when generating the comparison source data used for estimating a device, the device estimating apparatus 10 generates information in which respective contents (for example, a domain name) of the DNS queries are associated with attribute information of the devices that are transmission sources of the DNS queries. Thus, even when the number of devices that can be estimated by the device estimating apparatus 10 is increased, the amount of comparison source data used for estimating a device does not easily become extremely large. As a result, it is possible to prevent a large amount of memory of the device estimating apparatus 10 from being occupied and the amount of calculation from increasing at the time of estimating a device.

Figure 6:
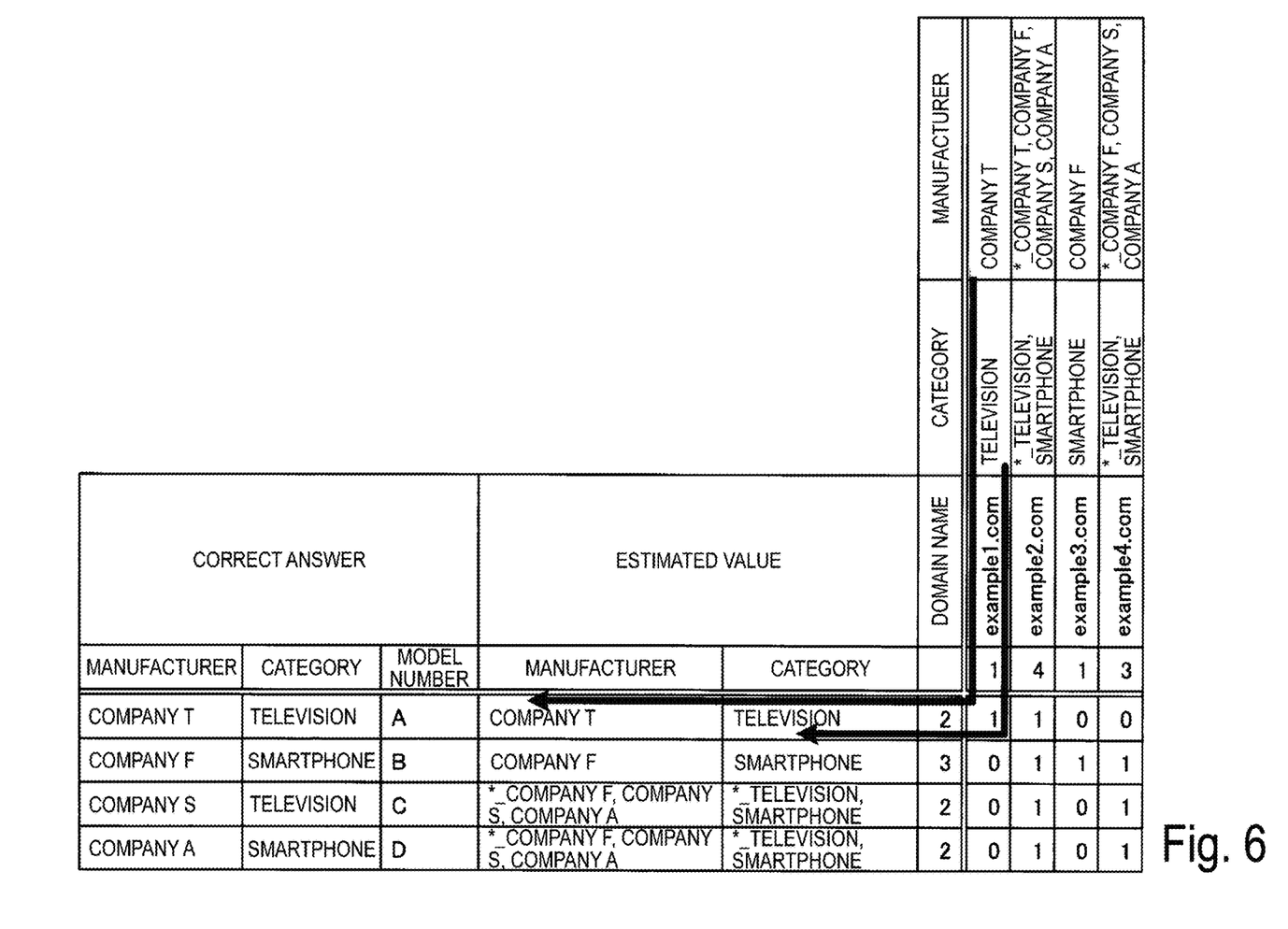
FIG. 6 is a diagram illustrating an example of processing of estimating a device.

Next, a specific example in which the estimation unit 124 estimates an estimation target device will be described with reference to FIG. 6. Here, a case where the estimation unit 124 estimates attributes of a device (a manufacturer and a category of the device) using the comparison source data illustrated in FIG. 6 will be described as an example.

For example, a case will be described where the estimation unit 124 acquires a DNS query including the domain name "example1.com" and a DNS query including the domain name "example2.com" from an estimation target device.

In this case, the estimation unit 124 reads a label of the category "television" and a label of the manufacturer "company T" associated with the domain name "example1.com" in the comparison source data. In addition, the estimation unit 124 reads a label of the category "television, smartphone" and a label of the manufacturer "company T, company F, company S, company A" associated with the domain name "example2.com" in the comparison source data. Then, the estimation unit 124 takes AND of the read labels of the domains and outputs the category "television" and the manufacturer "company T" as estimated values of attributes of the device.

For example, also in a case where the estimation unit 124 acquires a DNS query including the domain name "example2.com" and a DNS query including the domain name "example3.com" from an estimation target device, the estimation unit 124 performs a similar process.

In other words, the estimation unit 124 reads a label of the category "television, smartphone" and a label of the manufacturer "company T, company F, company S, company A" associated with the domain name "example2.com" in the comparison source data. In addition, the estimation unit 124 reads a label of the category "smartphone" and a label of the manufacturer "company F" associated with the domain name "example3.com" in the comparison source data. Then, the estimation unit 124 takes AND of the read labels of the domains and outputs the category "smartphone" and the manufacturer "company F" as estimated values of attributes of the device.

In addition, when attributes of an estimation target device (for example, a manufacturer and a category of the device) are estimated, the estimation unit 124 may take OR of labels read from the comparison source data. An example of estimation in this case will be described with reference to FIG. 7.

Figure 7:
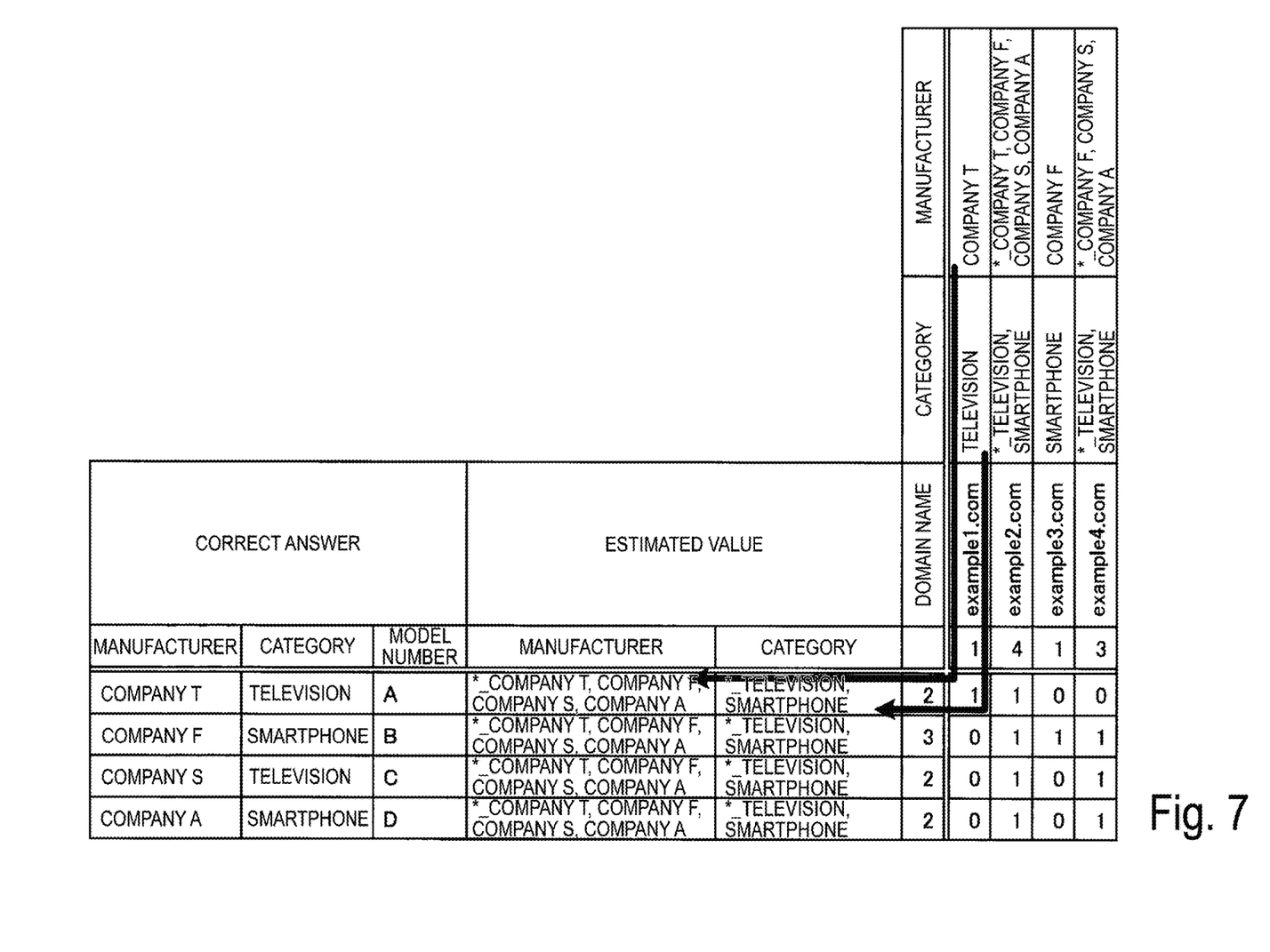
FIG. 7 is a diagram illustrating an example of processing of estimating a device.

Here, a case where the estimation unit 124 acquires a DNS query including the domain name "example1.com" and a DNS query including the domain name "example2.com" from an estimation target device will be described as an example.

In this case, as illustrated in FIG. 7, the estimation unit 124 reads a label of the category "television" and a label of the manufacturer "company T" associated with the domain name "example1.com" in the comparison source data. In addition, the estimation unit 124 reads a label of the category "television, smartphone" and a label of the manufacturer "company T, company F, company S, company A" associated with the domain name "example2.com" in the comparison source data. Then, the estimation unit 124 takes OR of the read labels of the domain names and outputs the category "television, smartphone" and the manufacturer "company T, company F, company S, company A" as estimated values of attributes of the device. In this way, the estimation unit 124 can estimate the attributes of the estimation target device more broadly.

In addition, in a case where the description of a label for each domain name in the comparison source data includes information of the number of devices corresponding to the label, the estimation unit 124 may estimate attributes of a device with the number of devices corresponding to the label taken into account.

For example, a case will be considered where the category label "television T (one unit)" and the manufacturer label "company T (one unit) are associated with the domain name "example1.com", and the category label "television (two units), smartphone (two units)" and the manufacturer label "company T (one unit), company F (one unit), company S (one unit), company A (one unit)" are associated with the domain name "example2.com" in the comparison source data illustrated in FIG. 7.

In this case, after performing weighting using the number of devices described inside the parentheses of the label associated with each domain name read from the comparison source data, the estimation unit 124 estimates attributes of the device. For example, after performing weighting for the labels associated with the domain name "example1.com"

and the domain name "example1.com" using the numbers of devices described inside the parentheses of the labels, the estimation unit 124 estimates that the possibility of the category of the estimation target device being "television" is 50%, the possibility of the category being "smartphone" is 50%, the possibility of the manufacturer being "company T" is 25%, the possibility of the manufacturer being "company F" is 25%, the possibility of the manufacturer being "company S" is 25%, the possibility of the manufacturer being "company A" is 25%, and the like.

In the embodiment described above, although a case where the attributes of a device estimated by the device estimating apparatus 10 are a category and a manufacturer of the device has been described as an example, the attributes may be a model number and the like of the device.

Program

In addition, a program implementing the functions of the device estimating apparatus 10 described in the embodiment described above is installed into a desired information processing apparatus (computer), so that these functions can be implemented. For example, by causing an information processing apparatus to execute the above-described program provided as package software or online software, the information processing apparatus can function as the device estimating apparatus 10. The information processing apparatus mentioned here includes a desktop or laptop personal computer. Further, a mobile communication terminal such as a smartphone, a mobile phone, a personal handyphone system (PHS), and a personal digital assistant (PDA), and the like, in addition to the above, are included in a category of the information processing apparatus. In addition, the functions of the device estimating apparatus 10 may be implemented in a cloud server.

Figure 8:
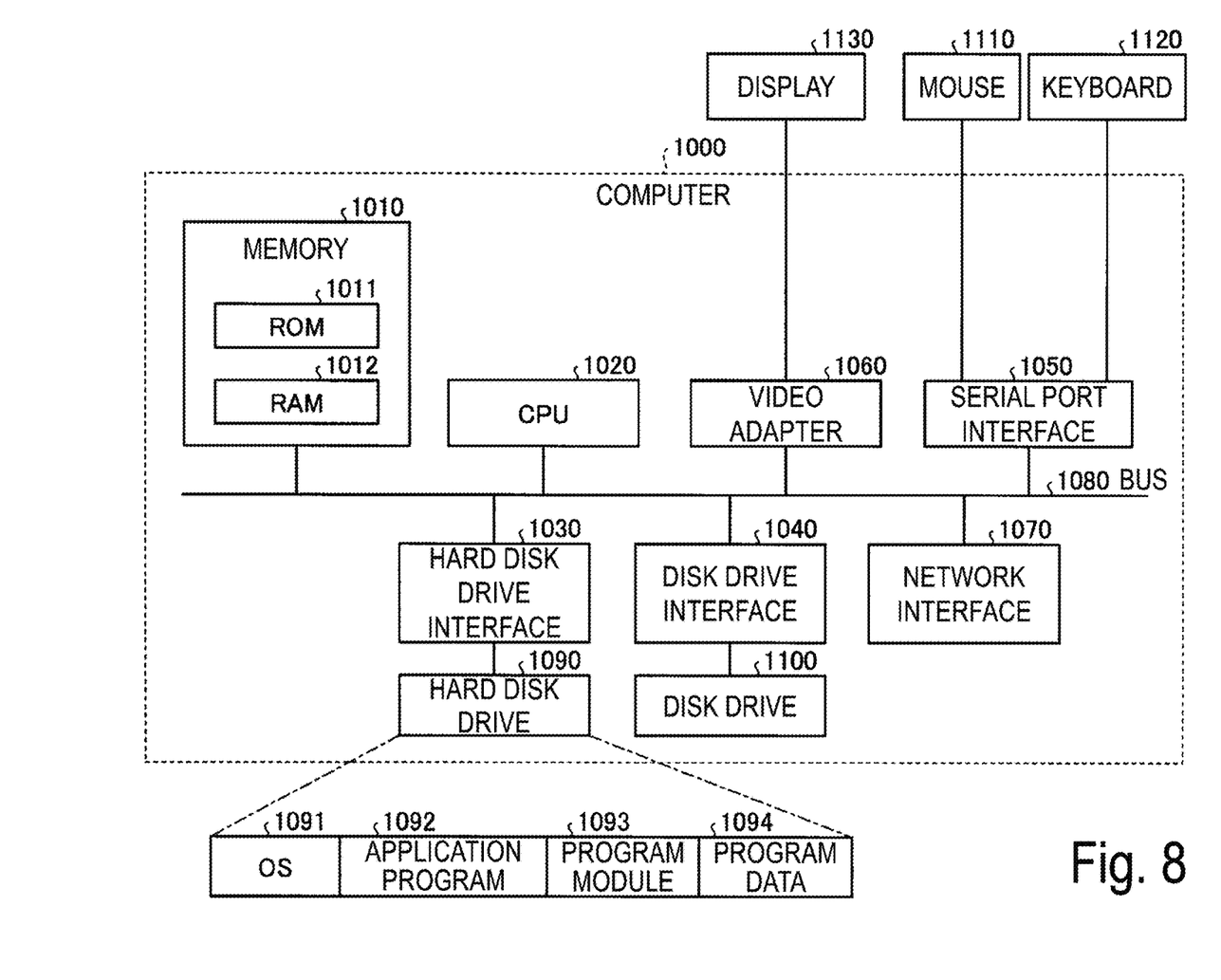
FIG. 8 is a diagram illustrating an example of a computer that executes a device estimating program.

One example of a computer that executes the program (a device estimating program) described above will be described with reference to FIG. 8. As illustrated in FIG. 8, a computer 1000 includes, for example, a memory 1010, a CPU 1020, a hard disk drive interface 1030, a disk drive interface 1040, a serial port interface 1050, a video adapter 1060, and a network interface 1070. These units are connected to each other through a bus 1080.

The memory 1010 includes a read only memory (ROM) 1011 and a random access memory (RAM) 1012. The ROM 1011 stores a boot program such as, for example, a basic input output system (BIOS). The hard disk drive interface 1030 is connected to a hard disk drive 1090. The disk drive interface 1040 is connected to a disk drive 1100. A removable storage medium such as a magnetic disk or an optical disk is inserted into the disk drive 1100. A mouse 1110 and a keyboard 1120, for example, are connected to the serial port interface 1050. A display 1130, for example, is connected to the video adapter 1060.

Here, as illustrated in FIG. 8, the hard disk drive 1090 stores, for example, an OS 1091, an application program 1092, a program module 1093, and program data 1094. The various types of data or information described in the above embodiments are stored in, for example, the hard disk drive 1090 or the memory 1010.

The CPU 1020 reads the program module 1093 and the program data 1094, stored in the hard disk drive 1090, onto the RAM 1012 as needed, and executes each of the aforementioned procedures.

The program module 1093 and the program data 1094 relevant to the above-described device estimating program are not limited to being stored in the hard disk drive 1090 and, for example, may be stored in a detachable storage medium and read by the central processing unit (CPU) 1020 via the disk drive 1100 or the like. Alternatively, the program module 1093 or the program data 1094 relevant to the program may be stored in another computer connected via a network such as a local area network (LAN) or a wide area network (WAN) and read by the CPU 1020 via the network interface 1070.

REFERENCE SIGNS LIST

10 Device estimating apparatus
11 Input/output unit
12 Control unit
13 Storage unit
20 DNS server
121 DNS query acquiring unit
122 Collection unit
123 Comparison source data generating unit
124 Estimation unit

The invention claimed is:

1. A device estimating apparatus comprising:
   first DNS query acquiring circuitry configured to acquire DNS queries transmitted from respective devices connected to a network;
   comparison source data generating circuitry configured to generate comparison source data in which respective contents of the acquired DNS queries are associated with attribute information of the respective devices that have transmitted the DNS queries having the contents;
   second DNS query acquiring circuitry configured to acquire one or more DNS queries from an estimation target; and
   estimation circuitry configured to read, for each DNS query acquired from the estimation target, attribute information of one or more devices associated with a content of the DNS query from the comparison source data and estimate an attribute of the estimation target using the read attribute information,
   wherein, when the comparison source data is generated, in a case where devices that have transmitted DNS queries having the same content have different attribute information, the comparison source data generating circuitry generates the comparison source data by associating the content of the DNS queries and a simple sum, a logical sum, or a logical product of the attribute information of the respective devices with the content of the DNS queries.

2. The device estimating apparatus according to claim 1, wherein, in a case where a plurality of DNS queries are acquired from the estimation target, the estimation circuitry estimates an attribute of the estimation target by reading, for each of the plurality of DNS queries, attribute information of one or more devices associated with a content of the DNS query from the comparison source data and calculating a simple sum, a logical sum, or a logical product of the read attribute information of the one or more devices.

3. A device estimating method, comprising:
   acquiring DNS queries transmitted from respective devices connected to a network;
   generating comparison source data in which respective contents of the acquired DNS queries are associated with attribute information of the respective devices that have transmitted the DNS queries having the contents;
   acquiring one or more DNS queries from an estimation target; and
   reading, for each DNS query acquired from the estimation target, attribute information of one or more devices associated with a content of the DNS query from the comparison source data and estimating an attribute of the estimation target using the read attribute information, wherein, in a case where a plurality of DNS queries are acquired from the estimation target, the method further performs:

estimating an attribute of the estimation target by reading, for each of the plurality of DNS queries, attribute information of one or more devices associated with a content of the DNS query from the comparison source data and calculating a simple sum, a logical sum, or a logical product of the read attribute information of the one or more devices.

4. A non-transitory computer readable medium including a device estimating program for causing a computer to execute:

acquiring DNS queries transmitted from respective devices connected to a network;

generating comparison source data in which respective contents of the acquired DNS queries are associated with attribute information of the respective devices that have transmitted the DNS queries having the contents;

acquiring one or more DNS queries from an estimation target; and reading, for each DNS query acquired from the estimation target, attribute information of one or more devices associated with a content of the DNS query from the comparison source data and estimating an attribute of the estimation target using the read attribute information, wherein, when the comparison source data is generated, in a case where devices that have transmitted DNS queries having the same content have different attribute information, the generating generates the comparison source data by associating the content of the DNS queries and a simple sum, a logical sum, or a logical product of the attribute information of the respective devices with the content of the DNS queries.

* * * * *